United States Patent
Karaoguz

(10) Patent No.: US 7,818,015 B2
(45) Date of Patent: Oct. 19, 2010

(54) METHOD OF DETERMINING OPTIMAL CELL CONFIGURATION BASED UPON DETERMINED DEVICE LOCATION

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1059 days.

(21) Appl. No.: 10/314,306

(22) Filed: Dec. 9, 2002

(65) Prior Publication Data

US 2004/0203889 A1 Oct. 14, 2004

Related U.S. Application Data

(60) Provisional application No. 60/409,939, filed on Sep. 12, 2002.

(51) Int. Cl.
*H04B 7/00* (2006.01)
*H04W 24/00* (2009.01)

(52) U.S. Cl. .................. 455/456.1; 455/457; 455/41.2; 455/41.3

(58) Field of Classification Search .............. 455/456.1, 455/450, 425, 41.2, 41.3, 457
See application file for complete search history.

(56) References Cited

U.S. PATENT DOCUMENTS

| 5,267,244 | A | | 11/1993 | Messerschmitt et al. | |
|---|---|---|---|---|---|
| 6,118,567 | A | * | 9/2000 | Alameh et al. | 398/191 |
| 6,216,006 | B1 | * | 4/2001 | Scholefield et al. | 455/450 |
| 6,414,635 | B1 | * | 7/2002 | Stewart et al. | 342/457 |
| 7,054,627 | B1 | * | 5/2006 | Hillman | 455/457 |
| 2002/0059453 | A1 | * | 5/2002 | Eriksson et al. | 709/238 |
| 2003/0083061 | A1 | * | 5/2003 | Robinson et al. | 455/425 |
| 2004/0203759 | A1 | * | 10/2004 | Shaw et al. | 455/433 |
| 2004/0203854 | A1 | * | 10/2004 | Nowak | 455/456.1 |
| 2004/0259566 | A1 | * | 12/2004 | Maanoja et al. | 455/456.1 |

FOREIGN PATENT DOCUMENTS

| WO | WO 00/27074 | | 5/2000 |
|---|---|---|---|
| WO | WO0150788 A1 | * | 7/2001 |
| WO | WO 01/59992 A2 | | 8/2001 |

OTHER PUBLICATIONS

"IEEE 802.11, A Technical Overview," Pablo Brenner, BreezeNet website, Jul. 8, 1997, www.sss-mag.com/pdf/80211p.pdf.

(Continued)

*Primary Examiner*—Vincent P Harper
*Assistant Examiner*—Marisol Figueroa
(74) *Attorney, Agent, or Firm*—McAndrews, Held & Malloy, Ltd.

(57) ABSTRACT

A configuration device for configuring a wireless device within a wireless cell can include a receiving unit configured to receive a request message from a wireless device within a wireless cell. In addition, the configuration device can include a first processing unit configured to determine location information of the wireless device, and a second processing unit configured to determine a communication capacity of the wireless device, and to estimate a communication requirement based on the request message. Furthermore, the configuration device can have a transmitting unit configured to transmit optimal information to the wireless device with respect to the request message.

14 Claims, 4 Drawing Sheets

OTHER PUBLICATIONS

Donny Jackson, Telephony, Ultrawideband May Thwart 802.11, Bluetooth Efforts, PRIMEDIA Business Magazines & Media Inc., Feb. 11, 2002.

Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.

Dr. Robert J. Fontana, "A Brief History of UWB Communications," Multispectral.com, Multispectral Solutions, Inc., www.multispectral.com/history.html, Aug. 20, 2002.

Gerald F. Ross, "Early Motivations and History of Ultra Wideband Technology," Anro Engineering, Inc., Multispectral.com, Multispectral Solutions, Inc., www.multispectral.com/history.html, Aug. 20, 2002.

Dr. Terence W. Barrett, "History of UltraWideband (UWB) Radar & Communications: Pioneers and Innovators," Proceedings and Progress in Electromagnetics Symposium 2000 (PIERS2000), Cambridge, MA, Jul. 2000.

Dr. Henning F. Harmuth, "An Early History of Nonsinusoidal Electromagnetic Technologies," Multispectral.com, Multispectral Solutions, Inc., www.multispectral.com/history.html, Aug. 20, 2002.

Rebecca Taylor, "Hello, 802.11b and Bluetooth: Let's Not Be Stupid!", ImpartTech.com, www.ImportTech.com/802.11-bluetooth.htm, Aug. 21, 2002.

Matthew Peretz, "802.11, Bluetooth Will Co-Exist: Study," 802.11-Planet.com, INT Media Group, Inc., Oct. 30, 2001.

"Bluetooth and 802.11: A Tale of Two Technologies," 10Meters.com, www.10meters.com/blue_802.html, Dec. 2, 2000.

Keith Shaw, "Bluetooth and Wi-Fi: Friends or foes?", Network World Mobile Newsletter, Network World, Inc., Jun. 18, 2001.

Joel Conover, "Anatomy of IEEE 802.11b Wireless," NetworkComputing.com, Aug. 7, 2000.

Bob Brewin, "Intel, IBM Push for Public Wireless LAN," Computerworld.com, Computerworld Inc., Jul. 22, 2002.

Ernest Khoo, "A CNET tutorial: What is GPRS?", CNETAsia, CNET Networks, Inc., Feb. 7, 2002.

Les Freed, "Et Tu, Bluetooth?", ExtremeTech.com, Ziff Davis Media Inc., Jun. 25, 2001.

Bluetooth & 802.11b—Part 1, www.wilcoxonwireless.com/whitepapers/bluetoothvs802.doc , Jan. 2002.

Bob Brewin, "Report: IBM, Intel, Cell Companies Eye National Wi-Fi Net," Computerworld.com, Computerworld Inc., Jul. 16, 2002.

Bob Brewin, "Microsoft Plans Foray Into Home WLAN Device Market," Computerworld.com, Computerworld Inc., Jul. 22, 2002.

Bob Brewin, "Vendors Field New Wireless LAN Security Products," Computerworld.com, Computerworld Inc., Jul. 22, 2002.

Jeff Tyson, "How Wireless Networking Works," Howstuffworks.com, Howstuffworks, Inc., www.howstuffworks.com/wireless-network.htm/printable, Aug. 15, 2002.

Curt Franklin, "How Bluetooth Works," Howstuffworks.com, Howstuffworks, Inc., www.howstuffworks.com/bluetooth.htm/printable, Aug. 15, 2002.

802.11b Networking News, News for Aug. 19, 2002 through Aug. 11, 2002, 80211b.weblogger.com/, Aug. 11-19, 2002.

"Wireless Ethernet Networking with 802.11b, An Overview," HomeNetHelp.com, Anomaly, Inc., www.homenethelp.com/80211.b/index.asp, Aug. 20, 2002.

"Simple 802.11b Wireless Ethernet Network with an Access Point," HomeNetHelp.com, Anomaly, Inc., www.homenethelp.com/web/diagram/access-point.asp, Aug. 20, 2002.

"Simple 802.11b Wireless Ethernet Network without an Access Point," HomeNetHelp.com, Anomaly, Inc., www.homenethelp.com/web/diagram/ad-hoc.asp, Aug. 20, 2002.

"Cable/DSL Router with Wired and Wireless Ethernet Built In," HomeNetHelp.com, Anomaly, Inc., www.homenethelp.com/web/diagram/share-router-wireless.asp, Aug. 20, 2002.

"Bridging a Wireless 802.11b Network with a Wired Ethernet Network" HomeNetHelp.com, Anomaly, Inc., www.homenethelp.com/web/diagram/wireless-bridged.asp, Aug. 20, 2002.

"Wireless Access Point (802.11 b) of the Router Variety," HomeNetHelp.com, Anomaly, Inc., www.homenethelp.com/web/diagram/share-wireless-ap.asp, Aug. 20, 2002.

Robert Poe, "Super-Max-Extra-Ultra-Wideband!", Business2.com, Oct. 10, 2000.

David G. Leeper, "Wireless Data Blaster," ScientificAmerican.com, Scientific American, Inc., May 4, 2002.

Steven J. Vaughan-Nichols, "Ultrawideband Wants to Rule Wireless Networking," TechUpdate.ZDNet.com, Oct. 30, 2001.

Jim Zyren and Al Petrick, "Brief Tutorial on IEEE 802.11 Wireless LANs," AN9829, Intersil Corporation, Feb. 1999.

"Overview of UWB!", PulseLink.net, Pulse~LINK, Inc., www.pulselink.net/ov_history.html, Sep. 4, 2002.

Robert X. Cringely, "The 100 Mile-Per-Gallon Carburetor—How Ultra Wide Band May (or May Not) Change the World," InterestingPeople.org, Jan. 26, 2002.

William A. Kissick, Editor, "The Temporal and Spectral Characteristics of Ultrawideband Signals," NTIA Report 01-383, Jan. 2001, www.its.bldrdoc.gov/pub/ntia-rpt/01-383/.

"Ultra Wide Band," www.ida.gov.sg/Website/IDAContent.nsf/dd1521fle79ecf3bc825682f0045a349/1856626048baf403c82569880267e26%3FOpenDocument+%22Full+duplex+UWB+handheld Aug. 20, 2002.

* cited by examiner

METHOD OF DETERMINING OPTIMAL CELL CONFIGURATION BASED UPON DETERMINED DEVICE LOCATION

CROSS REFERENCE TO RELATED APPLICATIONS

This application claims priority of U.S. Provisional Patent Application Ser. No. 60/409,939, entitled Method of Determining Optimal Cell Configuration Based Upon Determined Device Location, filed Sep. 12, 2002. The contents of the provisional application are hereby incorporated by reference.

BACKGROUND OF THE INVENTION

1. Field of the Invention

The present invention relates to a method of and an apparatus for using signal-generated location information to optimally configure a wireless cell network, within a wireless communication network environment such as IEEE 802.11, BLUETOOTH™, Ultra-Wideband (UWB) or any other wireless environment. In particular, the present invention relates to a method of and a system of optimally configuring a wireless device within a wireless cell based on the distance range location information and/or the geographic position location information of the wireless device. The present invention can be implemented in a wireless network device, which may include discrete devices or which may be implemented on a semiconductor substrate such as a silicon chip.

2. Description of the Related Art

Currently, cables and wires are predominately used as the communication medium for transferring information such as voice, video, data, etc. from one source to another. For example, cables or wires are commonly used to set up networking infrastructures in business offices, and are also used for personal home computing, and for connecting to the Internet. Therefore, cables and wires are generally used to configure a wired network wherein the cables and wires physically connect one or more device(s) to the wired network. And because the devices within the wired network are physically connected to the network, they remain stationary. Thus, reconfiguration of the wired network seldom occurs on a regular basis.

On the other hand, as wireless technology continues to advance and grow, the usage and the popularity of wireless devices will also increase and grow. Therefore, there may be an increase in wireless cell networks for providing coverage of wireless services therein. Since wireless devices can be mobile, wireless cell configuration can be implemented on a task-by-task basis to achieve optimal results. Accordingly, one way to optimize wireless cell configuration is to provide optimal location information within the wireless cell using determined signal-generated location information.

SUMMARY OF THE INVENTION

One example of the present invention can be a method of configuring a wireless device within a wireless cell. The method can include the steps of receiving a request message from a wireless device within a wireless cell, determining location information of the wireless device, and determining a communication capacity of the wireless device. In addition, the method can include the steps of estimating a communication requirement based on the request message, and providing optimal information to the wireless device with respect to the request message.

In another example, the present invention can relate to a configuration device for configuring a wireless device within a wireless cell. The configuration device can have a receiving unit configured to receive a request message from a wireless device within a wireless cell, a first processing unit configured to determine location information of the wireless device, and a second processing unit configured to determine a communication capacity of the wireless device. The second processing unit can also estimate a communication requirement based on the request message. In addition, the configuration device can have a transmitting unit configured to transmit optimal information to the wireless device with respect to the request message.

Additionally, another example of the present invention can provide a system of configuring a wireless device within a wireless cell. The system can include a receiving means for receiving a request message from a wireless device within a wireless cell, a first determining means for determining location information of the wireless device, and a second determining means for determining a communication capacity of the wireless device. Furthermore, the system can have an estimating means for estimating a communication requirement based on the request message, and a providing means for providing optimal information to the wireless device with respect to the request message.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
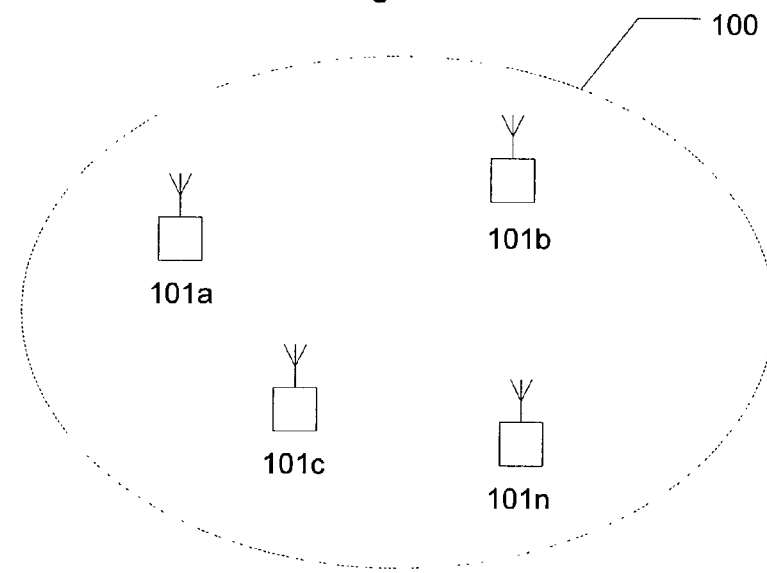
FIG. 1 illustrates one example of a wireless network configuration.

FIG. 1 illustrates one example of a wireless network. The wireless network of FIG. 1 can be an ad hoc network 100 having two or more wireless nodes, stations or devices 101a, 101b, 101c, . . . 101n therein (hereinafter, any reference to device(s) shall also include node(s) and/or station(s)). The ad hoc network 100 can be formed on a temporary basis whereby two or more wireless devices can recognize each other and can establish communications with each other. The wireless devices can be any wireless communication device configured to communicate with the Internet and having multimedia capabilities. For example, devices 101a, 101b, 101c, . . . 101n can be a smart phone, PDA, a mobile laptop computer, a web-pad, a digital video camera, an automobile equipped with a wireless communication device, or any mobile electronic device. Within the ad hoc wireless network 100, each device can communicate with each other on a peer-to-peer level.

Figure 2:
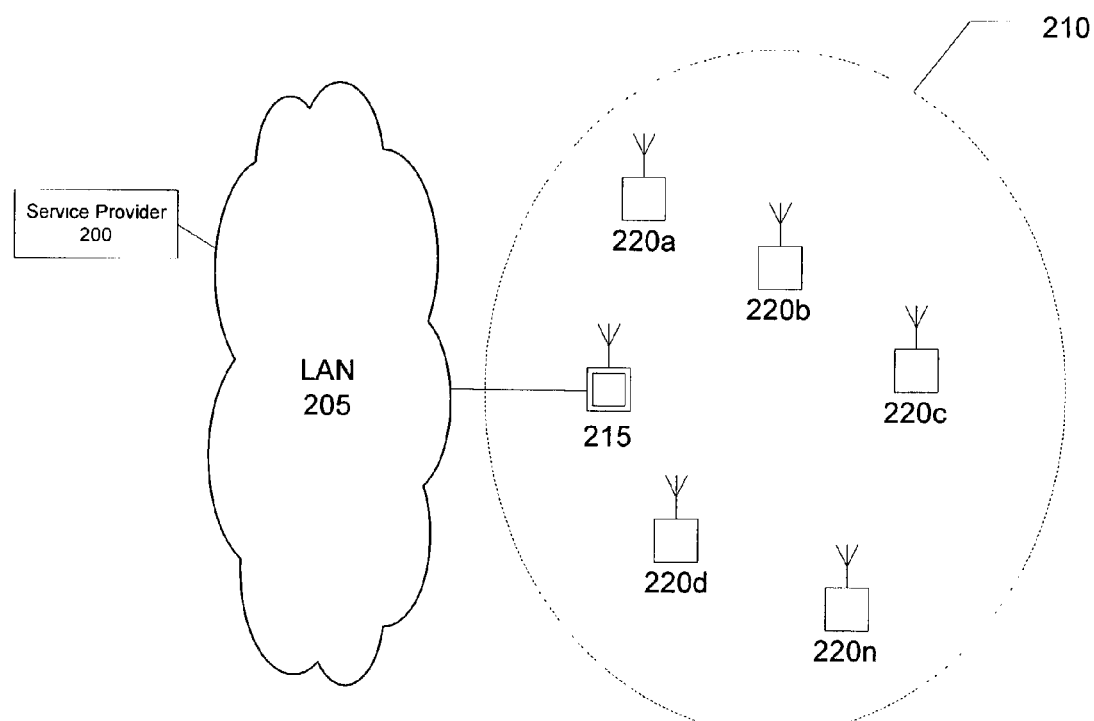
FIG. 2 illustrates another example of a wireless network configuration.

Another example of a wireless network is shown in FIG. 2. FIG. 2 provides a wireless infrastructure network 210 containing an Access Point 215 connected with a LAN 205, such as an Ethernet LAN. In addition, the wireless infrastructure network 210 can contain devices 220a, 220b, 220c, 220d, . . . 220n. The Access Point 215 is connected to the LAN 205 by wires or cables and can be formed as part of the wired network infrastructure 205, having at least one service provider 200. The service provider 200 can include one or more server(s) connected to the LAN 205. One function of the Access Point 215 can be a bridge or a connection between the wireless network 210 and the wired network 205. Accordingly, all communications between the devices 220a, 220b, 220c, 220d, . . . 220n or between the devices and the wired network 205 can go through Access Point 215.

The examples of wireless networks as illustrated in FIGS. 1 and 2 can use wireless technologies such as IEEE 802.11, BLUETOOTH™, UWB, etc.

Figure 3:
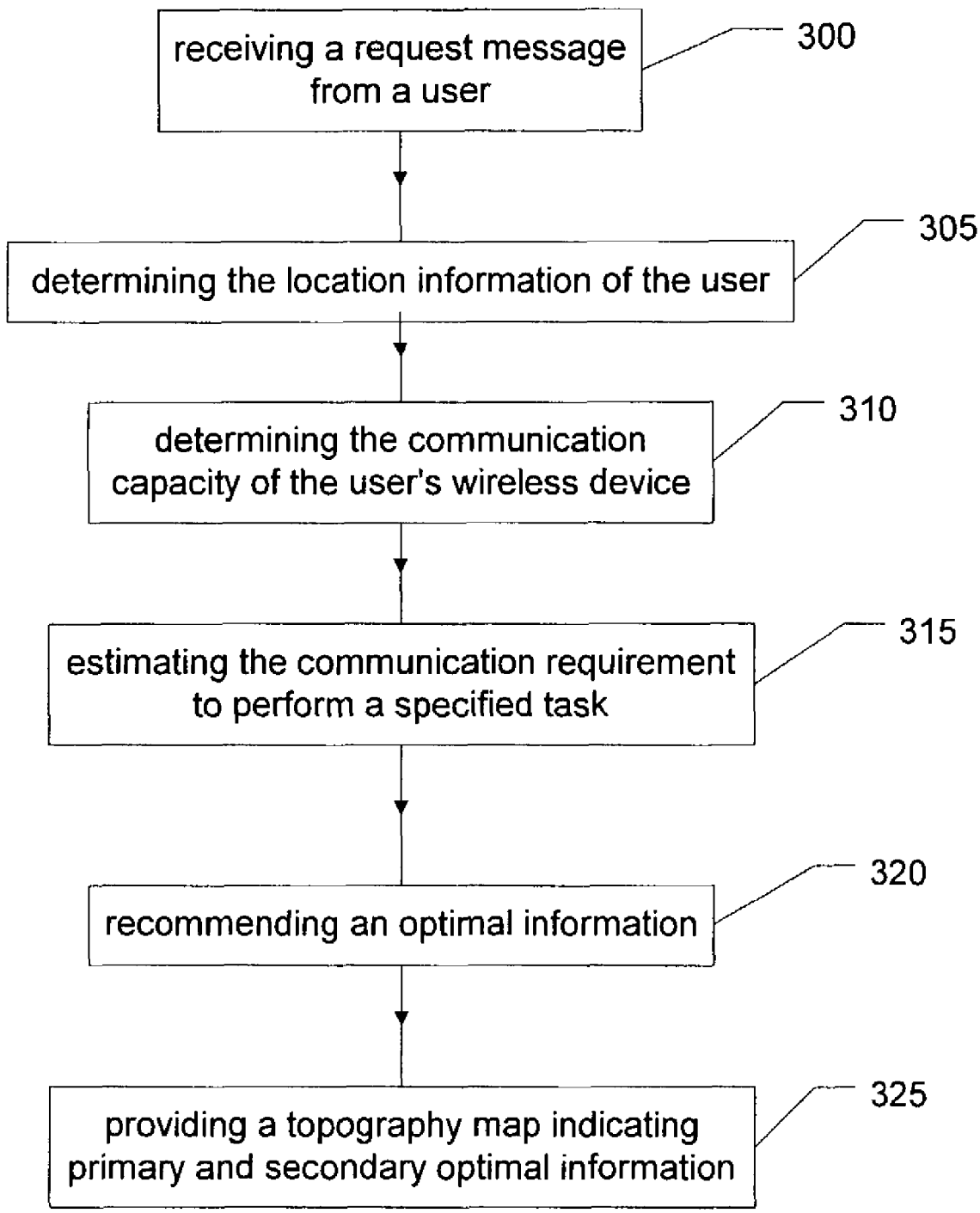
FIG. 3 illustrates a flow chart illustrating one example of a method of using signal-generated location information to configure a wireless cell network, according to the present invention.

FIG. 3 illustrates one example of a method of optimally configuring a wireless cell network using signal-generated location information in accordance with the present invention. Specifically, FIG. 3 illustrates one example of a method of using signal-generated location information, such as distance range location information and/or geographic position location information of a wireless device to optimally configure a wireless cell network having the wireless device therein. The method of the present example can be implemented in hardware, or software, or a combination of both hardware and software.

As mentioned above, as wireless technology continues to advance and grow, the usage and the popularity of wireless devices will also increase. Similarly, as wireless service providers offer more and convenient ways to access resources such as the Internet, the number of wireless cell providing coverage for network customers or users will increase. In order for the wireless network service provider to ensure that the connection and the communication with the wireless network is at an optimum, signal-generated location information of the wireless device within the wireless cell network can be used to optimally configure the wireless cell. Therefore, FIG. 3 illustrates one example of using signal-generated location information of a wireless device to optimally configure a wireless cell.

A user having a wireless device can either enter or can already exist in a geographic area having a wireless cell network and having wireless service coverage provide therein. The wireless network can be configured similar to the wireless network as shown in FIG. 2.

The wireless network can contain a configuration device, which acts as an access point for the wireless cell network. The configuration device can be connected to a wired LAN having a server. The wired LAN can be an Ethernet LAN wherein the Ethernet LAN includes one or more service provider(s). The user within the wireless cell network coverage area can send a request message from the wireless device to the configuration device. The request message can be a request to perform a specified task such as accessing resources or accessing services provided by or through the wireless cell network. The request message can include information such as the type of the wireless device, the data rate capacity of the wireless device, etc. In addition, the request message can be a request to perform a specified task wherein the request message can include information such as the type of task, the preferable data rate to achieve, the source and destination information, the priority of the task, etc. The configuration device can receive the request message from the user at step 300 of FIG. 3.

After the configuration device receives the request message, the configuration device initiates a signal-generating location information feature within the configuration device to determine the location information of the user who sent the request message at step 305. The configuration device can determine the location information such as the distance range location information or the geographic location information of the customer in various ways.

In one example, the configuration device can start by transmitting signals such as UWB signals within a predetermined default distance range at a corresponding power output level to locate the user's wireless device as well as other wireless devices within the wireless cell network. The configuration device can transmit UWB signals in unidirectional mode or omni-directional mode. In addition, the configuration device can transmit signals in pulses with short duty cycles.

After the transmission of signals either uni-directionally or omni-directionally, the transmitted signals can come into contact with the user's wireless device, and thereafter the signals can reflect back to the configuration device where the reflected signals can be received by the receiver within the configuration device.

Thereafter, the configuration device can monitor and register the timing of the transmission of the signals as well as the timing of the propagation of the signals. For example, the configuration device can monitor and record the time each signal is transmitted. Once the transmitted signals are reflected back and received by the receiver, the configuration device can monitor and record the time each signal is received. Based on this information, the configuration device can measure the total time duration for a signal to travel from the transmitter of the configuration device to the user's wireless device, and to reflect back and received by the receiver.

Based on this information and other factors, such as propagation delay, obstructions, the direction and angle of the signal transmission, the speed at which the signal travels compared to the speed at which light travels, etc., the configuration device can process the information in a location information processor to determine the distance range of the user's wireless device within the wireless cell network.

In another example, the configuration device can start by transmitting a range message signal to the user's wireless device within the wireless cell network. The range message signal can be sent out from a transmitter within the configuration device. In addition, the range message signals can be UWB signals transmitted in short duty cycles at a starting time T, such as T=0. Similar to the example above, the transmission of the range message signals can be unidirectional or omni-directional.

After sending the range message signals to the user's wireless device, the use's wireless device can receive the range message signal at a time T1. T1 for example, can be the sum of time T, the time of the processing delay $\Delta P$, and the time of the first propagation delay $\Delta T_1$. Thus, the user's wireless device can receive the range message signal at time T1, and can be represented as follows:

$$T1 = T + \Delta P + \Delta T_1$$

Once the user's wireless device receives the range message signals, the user's wireless device can process the received range message signal. The user's wireless device can determine whether or not to further establish communication with the configuration device, and abort the request. In the alternative, the user's wireless device can automatically respond and can send a range message acknowledgement signal to the configuration device. The range message acknowledgement signal can contain various information about the available device, such as the user's user ID, personal password, cryptography protocol, etc. The user's wireless device can send the range message acknowledgement signal at time T2. T2 for example, can be the sum of time T, the time of the processing delay ΔP, the time of the first propagation delay $\Delta T_1$, and the turn-around time ΔTA. The turn-around time ΔTA can represent the period of time from the time the user's wireless device receives the range message signal to the time the user's wireless device transmits the range message acknowledgement signal. Accordingly, time T2 can be represented as the following equation.

$$T2 = T + \Delta P + \Delta T_1 + \Delta TA$$

At time T2, a range message acknowledgement signal can be sent from the user's wireless device to the configuration device. After the range message acknowledgement signal reaches the configuration device, the range message acknowledgement signal can be received by the receiver. Once the range message acknowledgment signal is received, the configuration device can thereby determine a total time $T_{Total}$. The total time $T_{Total}$ can be the sum of time T2 and the second propagation time delay $\Delta T_2$. Accordingly, the total time $T_{Total}$ can be represented by the following equation.

$$T_{Total} = T2 + \Delta T_2$$

Based on the total time $T_{Total}$, the information embedded within the range message acknowledgement signal, and other factors such as device related delays, the configuration device can determine the distance range of the user's wireless device.

In yet another example, the configuration device can determine the geographic position of the user's wireless device. The configuration device can start by determining the surrounding environment in relation to itself. This information can be already stored within the configuration device if the configuration device remains relatively stationary, or the configuration device can determine the geographic area surrounding itself through a geographic position unit or other positioning systems such as a Global Positioning System.

Next, the configuration device of the present example can determine it's own position in relation to the immediate surrounding environment. Again, this information can be already stored within the configuration device if the configuration device remains relatively stationary. For example, the configuration device can access data regarding the interior design or interior layout of the immediate environment instantly from a storage unit. In the alternative, the configuration device can transmit initial detecting pulse signals to detect the interior design or interior layout of the surrounding area.

After determining the immediate surrounding geographic area in relation to its own position, the configuration device can determine the distance range of the user's wireless devices by way of the examples mentioned above. The steps of determining the distance range can include the steps transmitting signals within the surrounding environment, receiving one or more second signal(s), and measuring the total propagation time, etc.

Once the configuration device has determined the distance range of the user's wireless device in relation to its own position, the configuration device can thereafter determine the coordinates of the user's wireless device based on information such as the distance range information, the surrounding geographic environment information, the global geographic positioning information, etc. The coordinates of the user's wireless device can in part determine the geographic position of user's location.

It is noted that although the examples provided above can determine the distance range location information and/or the geographic position location information of a singular wireless device, the present invention can determine the location information of a plurality of wireless devices within a wireless cell network. It is further noted that the location information of each wireless device can assist in the determination of the signal propagation characteristics of each wireless device.

Following the determination of the location information of the user's wireless device, the configuration device can determine the communication capacity of the user's wireless device at step 310. In other words, the configuration device can determine the communication capacity such as the data type capacity and the data rate capacity of the user's wireless device. The data type capacity can inform the configuration device about the types of data the user's wireless device can manage. For instance, the data type capacity can inform the configuration device whether the user's wireless device can manage audio, video and/or text, etc. Similarly, the data rate capacity can inform the configuration device about the data rates the user's wireless device can achieve. The communication capacity information corresponding to the user's wireless device can be embedded in the request message or can be embedded in a separate message signal from the wireless device to the configuration device. Furthermore, the communication capacity information can be preprogrammed within a look-up table or a storage unit in the configuration device, and can be accessed by an identifier of the wireless device.

Furthermore, after receiving the request message sent from the user's wireless device, the configuration device can estimate a communication requirement with respect to the request message to perform a specified task at step 315. In other words, the configuration device can receive a request to perform a specified task, and thereafter can estimate or assess the requirement(s) such as the data type requirement(s) and/or the data rate requirement(s) to execute the requested task. For instance, suppose a configuration device receives a request message sent from a user operating on a wireless device. The request message requests to download a multimedia file from the Internet, wherein the multimedia file contains text, audio and video data. Upon receiving the request message, the configuration device determines that the task requested is to download a multimedia file from the Internet. The configuration device then evaluates the task and estimates what is required to perform the task. In doing so, the configuration device estimates that the task requires text, audio and video data processing capabilities, and estimates the necessary data rate to complete the task in a given time frame.

After the configuration device estimates the communication requirement(s) to perform the specified task, the configuration device can evaluate and assess the location information of all the wireless devices including the user's wireless device within the wireless cell, the propagation characteristics of each wireless device, the communication capacity of each wireless device, the communication requirement(s) to perform the specified task, etc., and determine a primary optimal location and/or a primary optimal device which can optimally execute the specified task as well as secondary optimal locations and secondary optimal devices, and so forth.

Once the configuration device makes its evaluation and assessment of what is or are the optimal location(s) and/or the optimal device(s), the configuration device can transmit a recommendation signal to the wireless device recommending one or more optimal location(s) and/or optimal device(s) to the user for performing the specified task at step 320. The configuration device can recommend and provide the optimal information to the wireless device in various ways such as a listing of optimal devices with corresponding optimal locations along with the corresponding data rates and data types information, or a topography map having the optimal locations indicated thereon as shown on FIG. 5, or any combination thereof.

Figure 5:
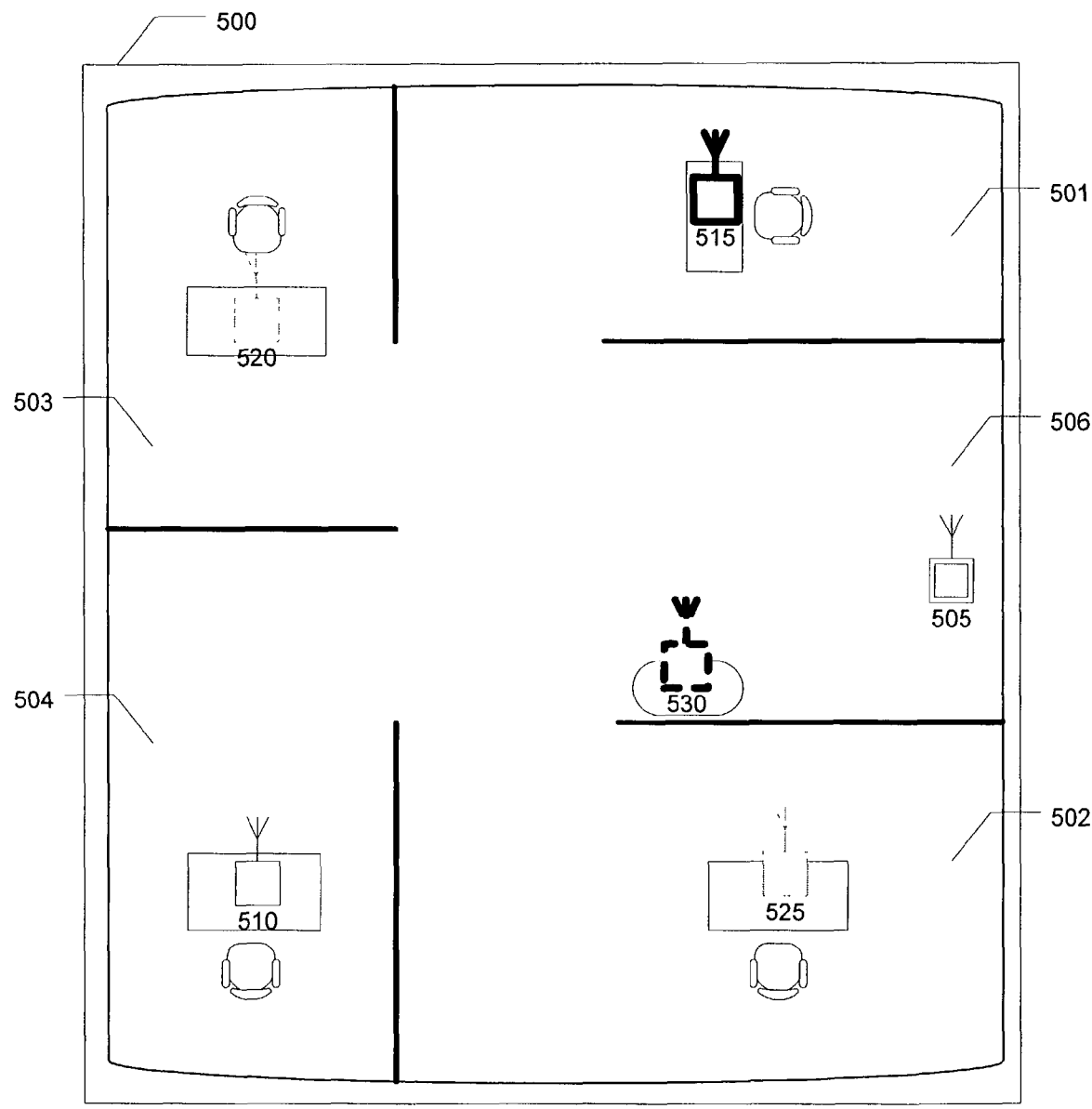
FIG. 5 illustrates one example of a topography display, according to the present invention.

FIG. 5 shows one example of a display illustrating optimal locations and optimal devices for the wireless device to perform a specified task. FIG. 5 shows a topography map 500 that can represent the interior layout such as a floor plan of a geographic area where the wireless device is located therein. The topography map 500 includes a configuration device 505 that can function as a master device or an Access Point. The configuration device 505 is located in hallway 506. In addition, topography map 500 shows four separate work areas 501, 502, 503 and 504. It is noted that the topography map 500 can represent actual detected wireless devices within the topographic area in solid lines and optimal locations in broken lines. In other words, topography map 500 shows work areas 501 and 510 as having actual detected wireless devices 515 and 510, respectively, and shows work areas 502, 503 and hallway 506 as having optimal locations to perform a requested specified task.

Topography map 500 of FIG. 5 also displays device 515 and optimal location 530 in bold which can represent that the device 515 and the optimal location 530 represent the primary optimal device and the primary optimal location. Therefore, the example shown in topography map 500 of FIG. 5 can recommend the user requesting to perform a specified task that the wireless device 515 located in work area 501 can be the primary optimal device to perform the task, and that location 530 in hallway 506 can be the primary optimal location to achieve the task. Locations 520 and 525 can be secondary optimal locations to achieve the task. It is noted that topography map 500 can be supplemented with additional information on the same display or on a separate portion of the display. The additional information can be corresponding data capabilities information such as data types and data rates, the coordinates of the location. Therefore, the configuration device of the present invention can provide the wireless device a topography map indicating the primary optimal information and the secondary primary information thereon at step 325.

Figure 4:
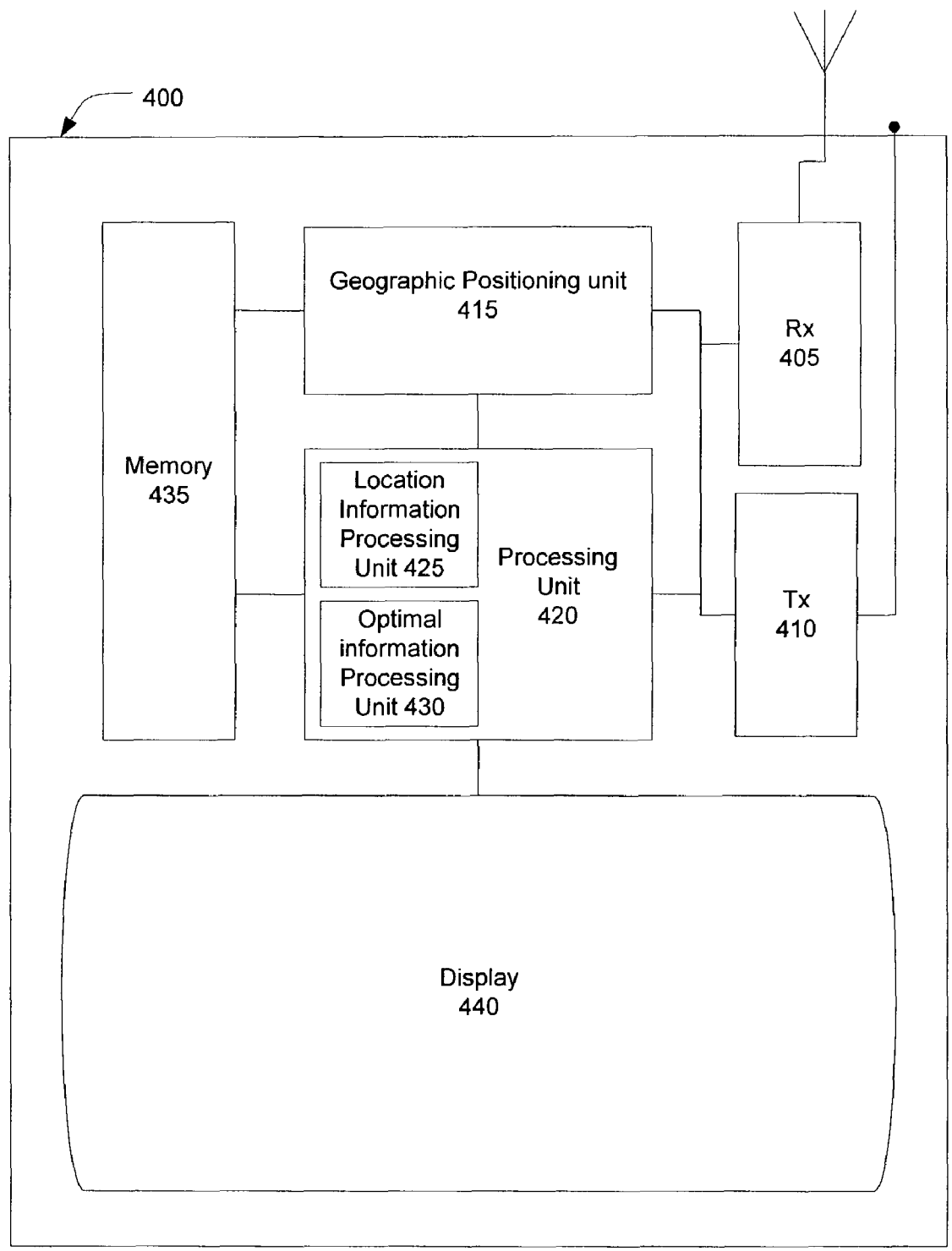
FIG. 4 illustrates one example of a hardware configuration for configuring wireless devices in a wireless cell based on signal-generated location information, according to the present invention.

FIG. 4 illustrates one example of a hardware configuration that can use determined location information to configure a wireless device within a wireless cell network, in accordance with the present invention. In addition, the hardware configuration of FIG. 4 can be in an integrated, modular and single chip solution, and therefore can be embodied on a semiconductor substrate, such as silicon. Alternatively, the hardware configuration of FIG. 4 can be a plurality of discrete components on a circuit board. The configuration can also be implemented as a general purpose device configured to implement the invention with software.

FIG. 4 illustrates a configuration device 400 configured to configure one or more wireless device(s) within a wireless cell network based on signal-generated location information of the wireless device(s). The configuration device 400 contains a receiver 405 and a transmitter 410. The transmitter 410 can transmit electromagnetic signals as well as various other signals including UWB signals. The transmitter 410 can transmit signals in short pulses in short duty cycles. In the alternative, the receiver 405 can receive electromagnetic signals as well as various other signals including UWB signals.

Furthermore, the configuration device 400 can include a geographic positioning unit 415 and a memory 435. The geographic positioning unit 415 can store geographic positioning information and interior floor plan information for a specific geographic area. Furthermore, the memory 435 can store information such as geographic maps, device capability information, or can store default values and look-up table, etc.

FIG. 4 also shows a processing unit 420, and a location information processing unit 425 for determining the location information such as the distance range or geographic location information of the wireless devices. It is noted that the location information processing unit 425 can be a separate processing unit. It is further noted that although the location information processing unit 425 is shown to be within the processing unit 420, the location information processing unit 425 can be a separate and distinct processing unit from the processing unit 420.

Therefore, the processing unit 420 can be the main processing unit and can process functions that are outside the functions of the location information processing unit 425. The location information processing unit 425 can therefore perform all the functions and tasks related to the determining of the range and geographic position location information of the available wireless devices. For instance, the location information processing unit 425 can measure or calculate the period of time period from the time a first signal is transmitted to the time a second signal is received. Similarly, the location information processing unit 425 can perform all the functions and tasks related to the determining of the geographic position of the available wireless devices. These processing functions can include determining the geographic coordinates of the available wireless devices within the surrounding geographic environment of the configuration device 400.

Furthermore, FIG. 4 includes an optimal information processing unit 430 and a display 440. The optimal processing unit 430 can perform tasks and function related to determining the communication capacity of a wireless device, estimating the communication requirements to perform a specified task, determining what the task is, determining which device or which location is the primary optimal information and which are the secondary optimal information, etc. The display 440 can be a plasma display, a LCD display or various other types of display for displaying multimedia information.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A configuration device for configuring a wireless device within a wireless cell network, said configuration device comprises:
   a receiving unit configured to receive a request message from a wireless device within a wireless cell network;
   a first processing unit configured to determine location information of the wireless device within a wireless cell network;
   a second processing unit configured to determine a communication capacity of the wireless device, and to estimate a communication requirement based on the request message; and
   a transmitting unit configured to transmit optimal information to the wireless device with respect to the request message in order to facilitate performance of a communications task requested in the request message through use of the provided optimal information, wherein the transmitting unit is configured to transmit said optimal information comprising primary optimal location information and a primary optimal device indicator to perform the communications task; and wherein the first processing unit is configured to determine location information of the wireless device within a wireless cell network, via wireless communication standards comprising at least one of a short range communication standard according to IEEE 802.11, a low cost short-range wireless specification and an Ultra Wide Band (UWB) communication standard.

2. The configuration device of claim 1, wherein the first processing unit is configured to determine a distance range of the wireless device.

3. The configuration device of claim 2, wherein the first processing unit is configured to determine a geographic position of the wireless device.

4. The configuration device of claim 3, wherein the second processing unit is configured to determine a data type capacity of the wireless device, and is configured to determine a data rate capacity of the wireless device.

5. The configuration device of claim 4, wherein the second processing unit is configured to estimate a data type requirement and a data rate requirement to perform the communication task.

6. The configuration device of claim 5, wherein the transmitting unit is configured to provide the wireless device with a topography map of the wireless cell, wherein the topography map comprises an indication of the primary optimal location and an indication of the primary optimal device.

7. The configuration device of claim 6, wherein the transmitting unit is configured to provide the wireless device with the topography map of the wireless cell, and wherein the topography map comprises the indication of at least one secondary optimal location and at least one secondary optimal device.

8. A system of configuring a wireless device within a wireless cell, said system comprising:
- a receiving means for receiving a request message from a wireless device within a wireless cell network;
- a first determining means for determining location information of the wireless device within the wireless cell network;
- a second determining means for determining a communication capacity of the wireless device;
- an estimating means for estimating a communication requirement based on the request message; and
- a providing means for providing optimal information to the wireless device with respect to the request message wherein the optimal information comprises primary optimal location information and a primary optimal device indicator in order to facilitate the performance of a communications task requested in the request message through use of the provided optimal information;
- wherein the first determining means is configured to determine location information of the wireless device within the wireless cell network via wireless communication standards comprising at least one of a short range communication standard according to IEEE 802.11, a low cost short-range wireless specification and an Ultra Wide Band (UWB) communication standard.

9. The system of claim 8, wherein the first determining means determines a distance range of the wireless device.

10. The system of claim 9, wherein the first determining means determines a geographic position of the wireless device.

11. The system of claim 10, wherein the second determining means determines a data type capacity and a data rate capacity of the wireless device.

12. The system of claim 11, wherein the estimating means estimates a data type requirement and a data rate requirement to perform the communication task.

13. The system of claim 12,
wherein the providing means provides the wireless device with a topography map of the wireless cell network, said topography map comprises an indication of the primary optimal location and an indication of the primary optimal device.

14. The system of claim 13, wherein the providing means provides the wireless device with the topography map of the wireless cell network, said topography map comprises the indication of at least one secondary optimal location, and the indication of at least one secondary optimal device.

* * * * *